Figure 3:
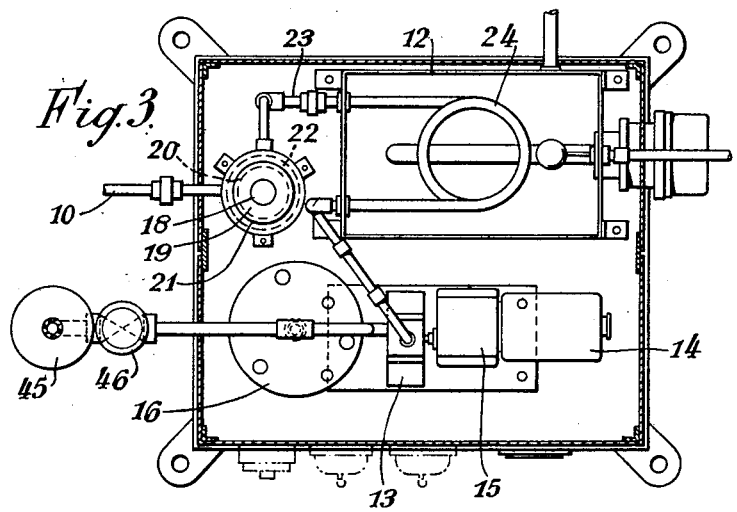

Jan. 6, 1953　　　　　M. H. LOWSON　　　　　2,624,782
METHOD AND APPARATUS FOR THE DETECTION OF WATER
Filed Aug. 17, 1949　　　　　　　　　　　　4 Sheets-Sheet 1
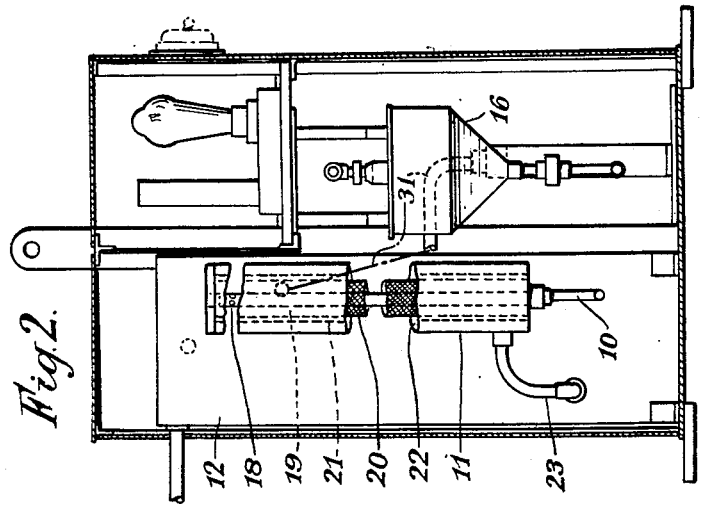
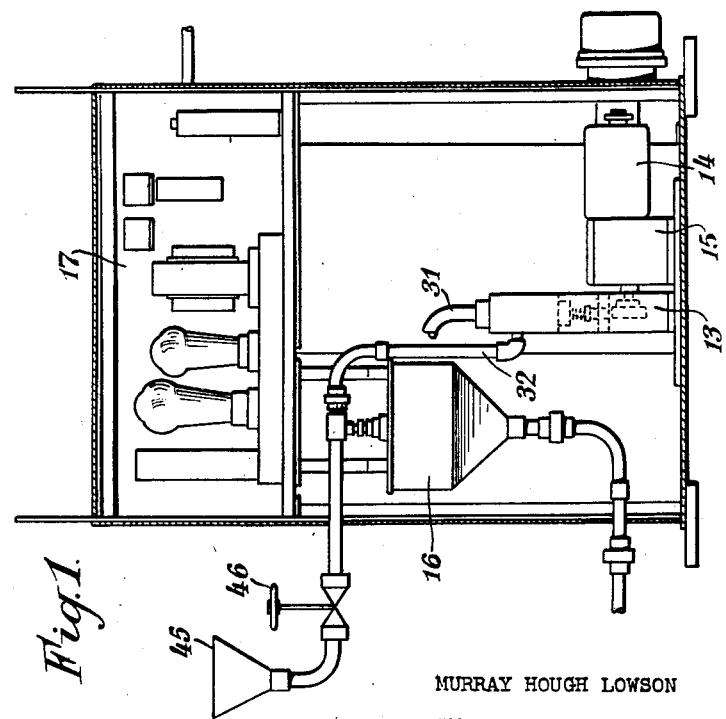
MURRAY HOUGH LOWSON
BY
Morgan, Finnegan & Durham
ATTORNEY Jan. 6, 1953          M. H. LOWSON          2,624,782

METHOD AND APPARATUS FOR THE DETECTION OF WATER

Filed Aug. 17, 1949          4 Sheets-Sheet 2

MURRAY HOUGH LOWSON

BY Morgan, Finnegan & Durham

ATTORNEY

Jan. 6, 1953 M. H. LOWSON 2,624,782
METHOD AND APPARATUS FOR THE DETECTION OF WATER
Filed Aug. 17, 1949 4 Sheets-Sheet 3
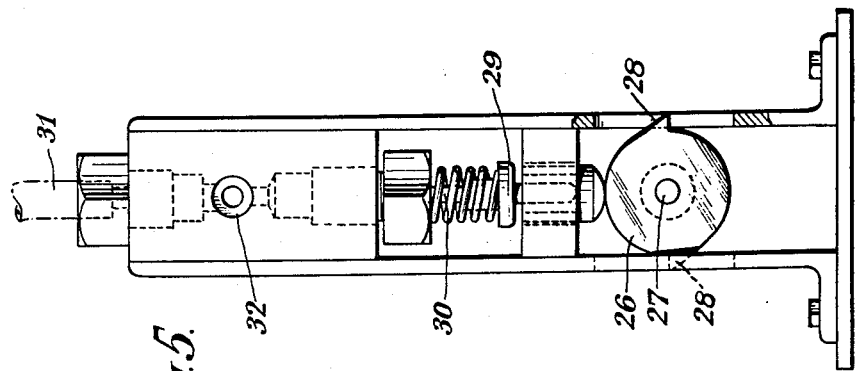
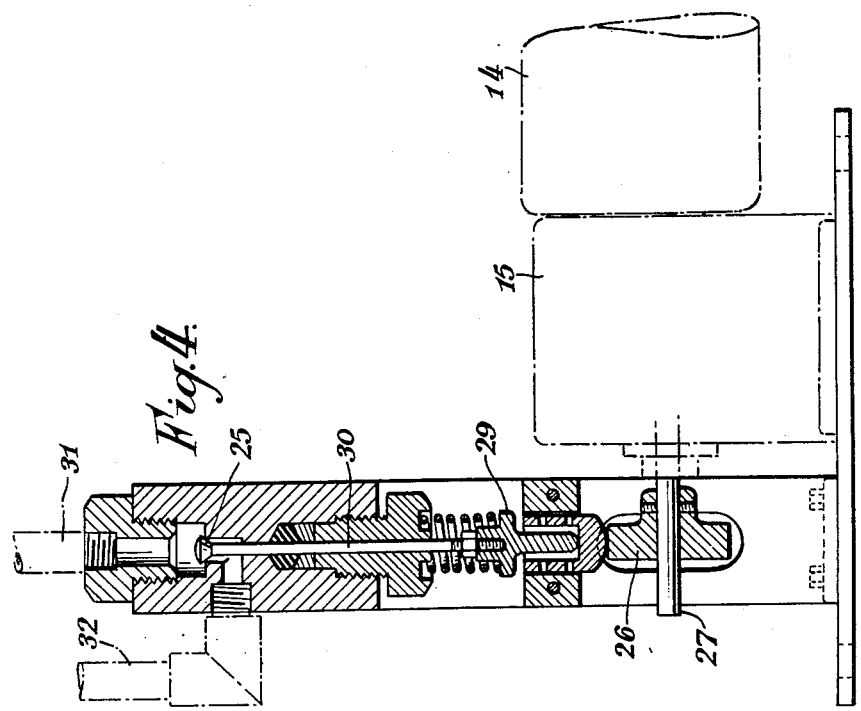
MURRAY HOUGH LOWSON
BY
*Morgan, Finnegan & Durham*
ATTORNEY

MURRAY HOUGH LOWSON

ATTORNEY

Patented Jan. 6, 1953

2,624,782

UNITED STATES PATENT OFFICE 2,624,782

METHOD AND APPARATUS FOR THE DETECTION OF WATER

Murray H. Lowson, Abadan, Iran, assignor to Anglo-Iranian Oil Company Limited, London, England, a British joint-stock corporation Application August 17, 1949, Serial No. 110,853
In Great Britain March 6, 1948

8 Claims. (Cl. 175—183)

The invention relates to a method and apparatus for the detection of water and more particularly to the detection of small quantities of water in crude petroleum.

It is undesirable for the crude oil supplied to a refinery to contain more than a certain amount of water and it is therefore necessary to take steps to ensure that this quantity of water is not exceeded. The first step for this purpose is to provide a method of detecting and estimating water in the oil. The standard method at present in use is by distillation in a Dean and Stark apparatus. This method cannot be conveniently adapted as a continuous method, however, and unless the greatest care is taken to ensure that the condenser and receiver tube of the apparatus are properly cooled and sufficient time allowed for the distillation to be carried out, the results obtained on samples of oil containing very small quantities of water are apt to be inaccurate.

The principal object of the present invention is to provide a continuous indication of the water content of the crude oil flowing in a pipe line.

According to the invention, a continuous method of detecting and indicating the presence of water in oil consists in passing a small quantity of the oil to the space between a pair of parallel electrodes to which an electric potential is applied, maintaining the oil stationary or slowly moving between said electrodes for sufficient time to allow the electrical conductivity of the oil to reach a maximum, and recording the current passing through the oil.

It is known that any water in crude oil flowing in a pipe line is in the form of minute globules as a result of the agitation of the oil during its passage up the well and into the pipe line. The majority of these globules have an average diameter of 5-20 microns so that they do not settle out rapidly, and even when settled are disinclined to coalesce. It is believed that the effect of the electric potential applied to the oil in accordance with the present invention, is to cause coalescence of the water globules to form larger globules which bridge the gap between the electrodes and allow a comparatively large current to pass, but it is to be understood that the invention is not to be regarded as in any way limited by such explanation.

The oil may be passed slowly between the electrodes so that any water globules present in the oil are caused to coalesce, but it has been found that motion appears to hinder the coalescence of more than a small proportion of the globules, and it is therefore preferred to allow the oil to remain motionless between the electrodes until the current passing through the oil has built up to a maximum. It has been found, for example, that using electrodes in the form of two parallel plates 1 mm. apart, the application of a D. C. potential of 300 volts causes globules of sufficient size to bridge the gap to be formed in 5 or 6 seconds. A convenient method of carrying out the invention is therefore to pass the oil between the electrodes in batches, allowing each batch to remain between the electrodes until the current passing reaches an apparent maximum, and then sweeping out the batch of oil between the electrodes with another batch).

It is to be understood that it is not an object of the invention accurately to measure the water contained in the oil so as to differentiate, for example, between .015% and .02% water in the oil, but it is sufficient if an indication of the water content is obtained before the maximum amount which can be tolerated is reached.

The invention also includes apparatus for detecting and indicating the presence of water in oil, comprising a pair of parallel electrodes between which the oil may be passed, means for feeding the oil in batches to the space between the electrodes, means for supplying direct current to the electrodes and for amplifying the current passing between the electrodes due to the conductivity of the oil, and means for recording the current passed.

The electrode assembly may advantageously comprise a pair of circular stainless steel plates held parallel in an insulating framework, a bore being formed in the center of the upper plate through which the oil is fed to flow radially between the plates. The lower plate can be set at any desired distance from the upper plate by means of a fine pitch screw.

The means for feeding batches of oil between the electrodes may advantageously consist of an intermittently operating valve which opens for a short time to allow oil to flow into the space between the electrodes and then closes for a sufficient time to allow the conductivity of the oil, held stationary between the electrodes, to reach a maximum.

Conventional electrical means, such as a thermionic valve assembly, may be employed for supplying direct current to the electrodes and for amplifying and recording the current passing between the electrodes.

A relay may be provided in series with the recording means to actuate a warning signal when a given current is exceeded.

The recording means may advantageously consist of a pen and chart device, the pen being carried by a pen arm which is attached to a shuttle armature free to rotate on pivoted bearings between the poles of an electromagnet, whereby on the passing of current the armature tends to turn into a position parallel to the lines of force due to the magnet, this movement being recorded on the chart by the movement of the pen arm.

Figure 6:
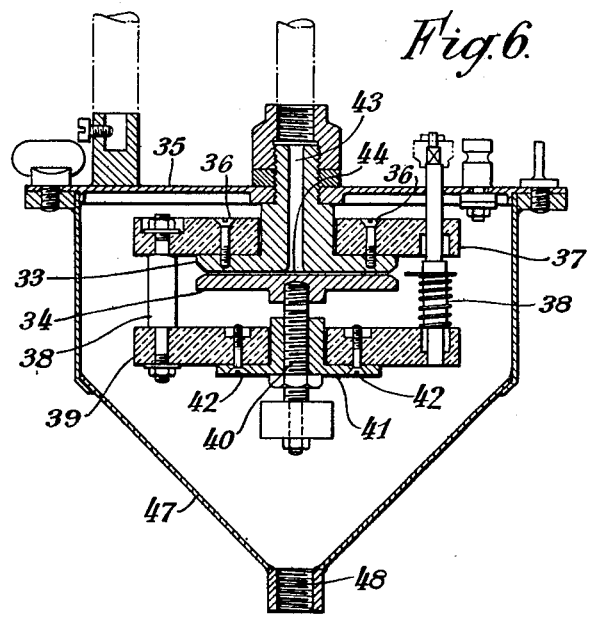
Figure 7:
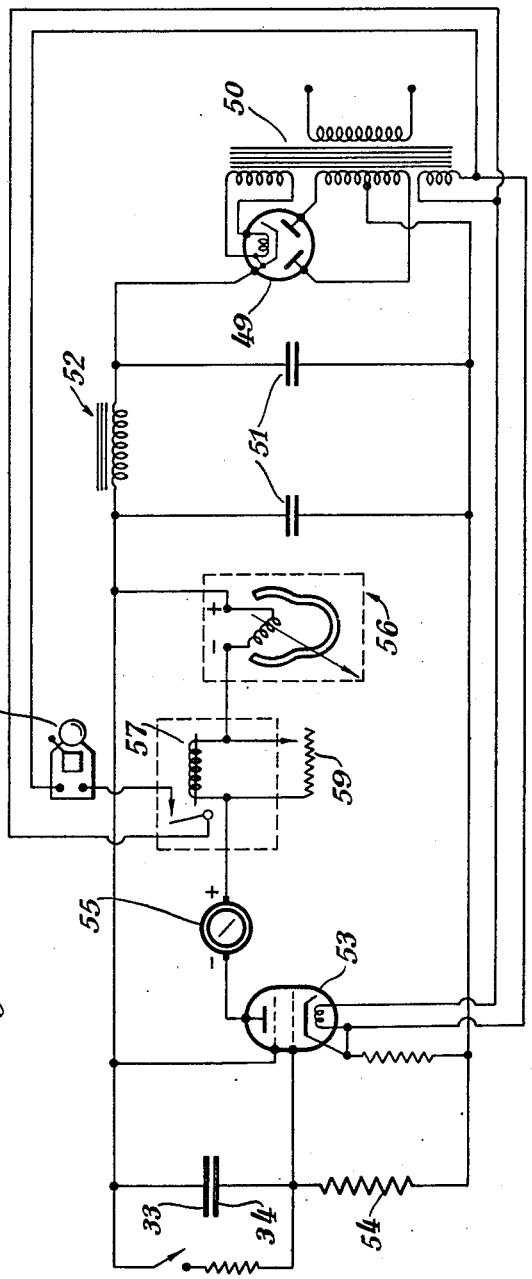

The invention will now be described by way of example with reference to the accompanying drawings, in which Figure 1 is a front elevation of the apparatus, Figure 2 is a side elevation corresponding to Figure 1, Figure 3 is a plan view corresponding to Figure 1, Figure 4 is a sectional elevation of the intermittent valve assembly, Figure 5 is a side elevation corresponding to Figure 4, Figure 6 is a sectional elevation of the electrode assembly and Figure 7 is the circuit diagram of the rectifier and amplifier and also shows the recording and alarm systems.

In installing the apparatus, a sampling connection is made to the pipe line by means of a pipe inserted at the top and extending to a position adjacent to the bottom of the pipe line thus ensuring that the most suitable sample of oil is obtained even though the pipe line is running below capacity. A one inch pipe is run from the sampling connection to the apparatus and then on to a downstream tapping where an orifice plate is inserted in the pipe line to permit the desired flow, for example, approximately 4 gallons per minute through the one inch pipe. The connection to the apparatus is made by means of a quarter inch pipe T'd into the one inch pipe. This method ensures a continuous flow of oil from the sampling connection to the apparatus and back into the pipe line.

Referring first to Figures 1-3, the oil enters the apparatus by the pipe 10 and passes through a filter 11 into a constant temperature bath 12. A valve assembly 13 is coupled to a motor 14 through reduction gearing 15 and allows the oil to flow in batches to the electrode assembly 16. The current passing between the electrodes is amplified by the amplifier unit 17 and the amplified current is used to operate a milliammeter, recorder and alarm bell. The electrode potential is supplied by the rectifying valve of the amplifier unit.

The oil filter 11 is provided to ensure that no fine grit or solid matter is allowed to pass between the electrodes where it might cause a short circuit or partial short circuit giving rise to a false alarm. It consists of an inner tube 18, connected at its base with the quarter inch oil supply pipe 10, and provided near its top with openings through which the oil passes into an annular space 19 formed between the tube 18 and a gauze cylinder 20 supported by a cylindrical member 21. The oil passes through the gauze cylinder into an outer annular chamber 22 which is provided with an outlet pipe 23 near its base.

The filtered oil is passed through a circular coil 24 immersed in the water bath 12. The temperature of the bath is kept at 130° F. ± 2° F., by a 1000 watt immersion heater controlled by a thermostat. A float-operated valve is incorporated to allow the water level to be maintained from the main. Distilled water is used to prevent corrosion of the metal parts and coating of the heaters with lime. The purpose of the constant temperature bath is to obviate changes in resistivity of the oil which would be caused by variations in temperature.

Referring now to Figures 4 and 5, the intermittent valve 25 is operated by a cam 26 mounted on the spindle 27 of the motor 14 which operates through reduction gearing 15 to give the cam 26 a speed of one revolution per minute. The cam is provided with two lifts 28 opposite each other which cause the valve 25 to open every 30 seconds. The valve is adjusted to remain open for 3-4 seconds by screwing up or down the screwed extension 29 on the valve stem 30. It is necessary to adjust the time the valve remains open according to the pressure of the feed. The filtered and preheated oil enters the valve assembly by the pipe 31 and leaves by the pipe 32.

Referring to Figure 6, the electrode assembly comprises a pair of circular, stainless steel electrodes 33 and 34, ¼" thick and 3" diameter, for example. The upper electrode 33 is secured to the top 35 of the electrode chamber and to it is attached, by means of screws 36, an upper insulating member 37 which supports, by means of columns 38, a lower insulating member 39. The lower electrode 34 is held parallel to the upper electrode 33 and is adjustable relative thereto by means of a screw 40 of fine pitch passing through a steel member 41 which is secured to the insulating member 39 by means of screws 42. The preferred setting of the electrodes to combine sensitivity with reasonable freedom from short circuits due to dirt is 0.6 mm. The oil enters the space between the electrodes 33 and 34 by means of a pipe 43 connecting with a hole 44 in the center of the top electrode 33 and flows radially outward between the electrodes. Each time the intermittent valve closes, the oil is held at rest between the electrodes by capillarity and when the intermittent valve opens the oil between the electrodes is swept out and replaced by fresh oil for the cycle of operations to be repeated. In order to set the electrodes for actuating the alarm at a given water content in the oil, a sample of oil with the required amount of water in it is introduced between the electrodes by pouring it into the funnel 45 (Figures 1 and 3), connecting with the electrode assembly by means of valve 46 (Figures 1 and 3), and the spacing between the electrodes may then be adjusted until the relay just operates to ring the bell. The bottom 47 of the electrode chamber is shaped conically to prevent the accumulation of salt and sludge. The exit 48 of the electrode chamber is provided with a choke (not shown) in order that the pressure inside the chamber may be varied.

Referring now to Figure 7, a rectifying valve 49, connected by means of condensers 51 and choke 52, to the electrodes 33 and 34 and to the amplifying valve 53. An increase of current in the electrode circuit, due to the presence of water in the oil between the electrodes, causes an increase in potential across the 250,000 ohm resistance 54 and this change in potential has the effect of decreasing the negative bias on the control grid of the amplifying valve 53 causing an increase in anode current which is registered on the recording milliammeter 55 included in the anode circuit of the amplifying valve 53. Included also in the anode circuit of the amplifying valve 53 is a recorder 56 which may conveniently be of the pen and chart type. In series with the recorder 56 and milliammeter 55 is a relay 57 which is incorporated so that when a given current is exceeded the relay will trip and actuate an external alarm bell. A variable resistance 59 is wired in shunt with the relay so that the current required to operate the relay may be selected. It has been found convenient to set the relay to operate at half scale reading on the recorder and then set the electrodes so that a sample, with the desired water content at which the alarm should be given, will just cause the relay to trip when poured into the test funnel. The 250,000 ohm resistance 54 may be replaced by a variable resistance of this value for variable sensitivity.

Using the particular apparatus described, the presence of 0.01% water in oil can be detected, and quantitative measurements of the water content of the oil may be obtained within the limits of accuracy of ±20%.

I claim:

1. A method of detecting the presence of, and measuring, minute amounts of water in oil, comprising; passing the oil to a space between a pair of closely spaced parallel electrodes, applying an electric potential between said electrodes, retaining said oil in the form of a thin film of not more than about one millimeter in thickness between said electrodes until a maximum current is reached between said electrodes through said oil as a result of the presence of water in said oil, and measuring said maximum current.

2. Apparatus for detecting the presence of, and measuring, minute amounts of water in oil comprising a pair of parallel electrodes spaced not more than one millimeter apart between which the oil may be retained in the form of a thin film, means for feeding the oil in batches to said space, means for supplying direct current to said electrodes and for amplifying current passing between said electrodes due to the presence of water in said oil, and means for recording the maximum current passed.

3. Apparatus according to claim 2 in which the space between the electrodes is approximately from 0.6 mm. to 1.0 mm.

4. Apparatus according to claim 2, in which the electrode assembly comprises a pair of circular stainless steel plates held parallel in an insulating framework, a bore being formed in the centre of the upper plate through which the oil is fed to flow radially between the plates, and the lower plate being adjustable so that it may be set at any desired distance from the upper plate.

5. Apparatus according to claim 2, in which the means for feeding the oil in batches to the space between the electrodes consists of an intermittently operating valve which opens for a short time to allow oil to flow into the space between the electrodes and then closes for a sufficient time to allow the conductivity of the oil, held stationary between the electrodes, to reach a maximum.

6. Apparatus according to claim 2, comprising a thermionic valve assembly for supplying direct current to the electrodes and for amplifying and recording the current passing between the electrodes.

7. Apparatus according to claim 6, wherein the thermionic valve assembly includes a relay, in series with the recording means, to actuate a warning signal when a given current is exceeded.

8. A method of detecting the presence of, and measuring, minute amounts of water in oil, comprising passing the oil in batches to the space between a pair of closely spaced parallel electrodes so that each batch forms a thin film of oil of not more than about one millimeter in thickness between the electrodes, applying an electric potential between the electrodes, recording the current passing through the film of oil, retaining each batch stationary between the electrodes until the current passing reaches a maximum and then sweeping out the batch of oil with another batch.

MURRAY H. LOWSON.

REFERENCES CITED

The following references are of record in the file of this patent:

UNITED STATES PATENTS

| Number | Name | Date |
| --- | --- | --- |
| 1,826,247 | Heppenstall | Oct. 6, 1931 |
| 1,870,282 | Cover | Aug. 9, 1932 |
| 1,886,085 | Copland | Nov. 1, 1932 |
| 1,890,545 | Limbrick | Dec. 13, 1932 |
| 1,913,436 | Eckstein | June 13, 1933 |
| 2,085,007 | Conrath | June 29, 1937 |
| 2,183,333 | Hart | Dec. 12, 1939 |
| 2,349,992 | Schrader | May 30, 1944 |
| 2,439,354 | Wolcott | Apr. 6, 1948 |